US011800154B2

(12) United States Patent
Kotra et al.

(10) Patent No.: US 11,800,154 B2
(45) Date of Patent: Oct. 24, 2023

(54) IMAGE PROCESSING DEVICE AND METHOD FOR PERFORMING QUALITY OPTIMIZED DEBLOCKING

(71) Applicant: HUAWEI TECHNOLOGIES CO., LTD., Guangdong (CN)

(72) Inventors: Anand Meher Kotra, Munich (DE); Semih Esenlik, Munich (DE); Biao Wang, Shenzhen (CN); Han Gao, Munich (DE); Zhijie Zhao, Munich (DE); Jianle Chen, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/211,638

(22) Filed: Mar. 24, 2021

(65) Prior Publication Data

US 2021/0281884 A1 Sep. 9, 2021

Related U.S. Application Data

(63) Continuation of application No. PCT/CN2019/107409, filed on Sep. 24, 2019.
(Continued)

(51) Int. Cl.
*H04N 19/14* (2014.01)
*H04N 19/80* (2014.01)
(Continued)

(52) U.S. Cl.
CPC ......... *H04N 19/86* (2014.11); *H04N 19/117* (2014.11); *H04N 19/14* (2014.11); *H04N 19/176* (2014.11); *H04N 19/182* (2014.11); *H04N 19/80* (2014.11)

(58) Field of Classification Search
None
See application file for complete search history.

(56) References Cited

U.S. PATENT DOCUMENTS 9,906,790 B2    2/2018  Kim et al.
10,469,868 B2 * 11/2019  Xi ........................ H04N 19/433
(Continued)

FOREIGN PATENT DOCUMENTS

CN            1444408 A      9/2003
CN          103385001 A     11/2013
(Continued)

OTHER PUBLICATIONS

Document: JVET-L0226-r1, Anand Meher Kotra et al., CE11-related: Position dependent adaptive Tc clipping range for deblocking filter, Joint Video Experts Team (JVET) of ITU-T SG 16 WP 3 and ISO/IEC JTC 1/SC 29/WG 11, 12th Meeting: Macao, CN, Oct. 3-12, 2018, total 10 pages.
(Continued)

*Primary Examiner* — Mohammad J Rahman
(74) *Attorney, Agent, or Firm* — Gregg L. Jansen

(57) ABSTRACT

An image processing device for use in an image encoder and/or an image decoder, for deblocking a block edge between a first block and a second block of an image encoded with a block code, is provided. The image processing device comprises a filter for filtering the block edge, configured to, for at least some of the pixels to be filtered, within a deblocking range from the block edge, the deblocking range being perpendicular to the block edge, determine a filtered pixel value from an original pixel value of the pixel and at least one further pixel value, determine a clipping value of the pixel, dependent upon a distance of the pixel from the block edge, and clip the filtered pixel value, using the clipping value resulting in a deblocked pixel value.

17 Claims, 7 Drawing Sheets

Related U.S. Application Data

(60) Provisional application No. 62/735,712, filed on Sep. 24, 2018.

(51) Int. Cl.
   *H04N 19/86* (2014.01)
   *H04N 19/117* (2014.01)
   *H04N 19/176* (2014.01)
   *H04N 19/182* (2014.01)

(56) References Cited

U.S. PATENT DOCUMENTS

| | | | |
|---|---|---|---|
| 2005/0024487 A1* | 2/2005 | Chen | H04N 19/156 375/E7.146 |
| 2007/0071106 A1* | 3/2007 | Graham | G06F 9/30032 375/E7.176 |
| 2011/0170793 A1* | 7/2011 | Sato | H04N 19/105 382/238 |
| 2011/0194614 A1 | 8/2011 | Norkin et al. | |
| 2013/0170562 A1 | 7/2013 | Van Der Auwera et al. | |
| 2013/0294525 A1 | 11/2013 | Norkin et al. | |
| 2014/0023136 A1* | 1/2014 | Park | H04N 19/80 375/240.12 |
| 2015/0117793 A1* | 4/2015 | Deng | G06T 5/002 382/261 |
| 2015/0146795 A1* | 5/2015 | Norkin | H04N 19/182 375/240.24 |
| 2015/0264406 A1 | 9/2015 | Kim et al. | |
| 2018/0054632 A1* | 2/2018 | Nakagawa | H04N 19/82 |
| 2018/0146213 A1* | 5/2018 | Andersson | H04N 19/82 |
| 2018/0192071 A1* | 7/2018 | Chuang | H04N 19/517 |
| 2019/0261020 A1 | 8/2019 | Galpin et al. | |

FOREIGN PATENT DOCUMENTS

| | | |
|---|---|---|
| CN | 106105201 A | 11/2016 |
| CN | 106604039 A | 4/2017 |
| CN | 107426571 A | 12/2017 |
| EP | 2870758 B1 | 11/2016 |
| JP | 2014207718 A | 10/2014 |
| KR | 101001676 B1 | 12/2010 |
| RU | 2557766 C2 | 7/2015 |
| WO | 2011113343 A1 | 9/2011 |
| WO | 2011126287 A2 | 10/2011 |
| WO | 2012096623 A1 | 7/2012 |
| WO | 2012119540 A1 | 9/2012 |
| WO | 2013034649 A1 | 3/2013 |
| WO | 2013064654 A1 | 5/2013 |
| WO | 2013104298 A1 | 7/2013 |
| WO | 2012096614 A3 | 9/2013 |
| WO | 2014007735 A1 | 1/2014 |
| WO | 2018057339 A1 | 3/2018 |

OTHER PUBLICATIONS

Document: JCTVC-C403, Thomas Wiegand et al., WD1: Working Draft 1 of High-Efficiency Video Coding, Joint Collaborative Team on Video Coding (JCT-VC) of ITU-T SG16 WP3 and ISO/IEC JTC1/SC29/WG11, 3rd Meeting Guangzhou, CN, Oct. 7-15, 2010, total 137 pages.
ITU-T H.261 (Mar. 1993), Line Transmission of Non-Telephone Signals, Video Codec for Audiovisual Services at p x 64 kbits, total 29 pages.
ITU-T H.264(Apr. 2017), Series H: Audiovisual and Multimedia Systems, Infrastructure of audiovisual services—Coding of moving video, Advanced video coding for generic audiovisual services, total 812 pages.
ITU-T H.265(Feb. 2018), Series H: Audiovisual and Multimedia Systems Infrastructure of audiovisual services—Coding of moving video, High efficiency video coding, total 692 pages.
Norkin Andrey: "HEVC-based deblocking filter with ramp preservation properties", 2014 IEEE International Conference on Imageprocessing (ICIP), IEEE, 2014, 5 pages.
Anonymous: "Lookup table—Wikipedia, the free encyclopedia", Mar. 23, 2016 (Mar. 23, 2016), pp. 1-7, XP055889099.
Andrey Norkin et al.: "Chapter 7: In-Loop Filters in HEVC" In: "High Efficiency Video Coding (HEVC)", Aug. 23, 2014 (Aug. 23, 2014), Springer International Publishing, Cham, XP055614202.

* cited by examiner

IMAGE PROCESSING DEVICE AND METHOD FOR PERFORMING QUALITY OPTIMIZED DEBLOCKING

CROSS-REFERENCE TO RELATED APPLICATIONS

This application is a continuation of International Application No. PCT/CN2019/107409, filed on Sep. 24, 2019, which claims priority to U.S. provisional Application No. 62/735,712, filed on Sep. 24, 2018. The disclosures of the aforementioned applications are hereby incorporated by reference in their entireties.

TECHNICAL FIELD

Embodiments of the present disclosure relate to the field of picture processing, for example still picture and/or video picture coding. Especially, the disclosure deals with improvements of the deblocking filter.

BACKGROUND

Embodiments of the present disclosure relate to the field of picture processing, for example still picture and/or video picture coding. Especially, the disclosure deals with improvements of the deblocking filter.

Video coding schemes such as H.264/AVC and HEVC are designed along the successful principle of block-based hybrid video coding. Using this principle, a picture is first partitioned into blocks and then each block is predicted by using intra-picture or inter-picture prediction. These blocks are coded relatively from the neighboring blocks and approximate the original signal with some degree of similarity. Since coded blocks only approximate the original signal, the difference between the approximations may cause discontinuities at the prediction and transform block boundaries. These discontinuities are attenuated by the deblocking filter. HEVC replaces the macroblock structure of H.264/AVC with the concept of coding tree unit (CTU) of maximum size 64×64 pixels. The CTU can further be partitioned into a quadtree-decomposition scheme into smaller coding units (CU), which can be subdivided down to a minimum size of 8×8 pixels. HEVC also introduces the concepts of prediction blocks (PB) and Transform blocks (TB).

In HEVC, two filters are defined in deblocking filter: the normal filter and the strong filter. The normal filter modifies at most two samples on both sides of an edge. The strong filter looks at three additional samples along the edge in comparison to a threshold. If all of those checks are true then the strong filter is applied. The strong filter has a more intensive smoothing effect for samples along the edge and can modify at most three samples on both sides of an edge.

ITU-T VCEG (Q6/16) and ISO/IEC MPEG (JTC 1/SC 29/WG 11) are studying the next generation video codec: Versatile Video Coding (VVC). This new video codec standard aims for a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (WET) to evaluate compression technology designs proposed by their experts in this area.

The VVC Test Model (VTM) describes the features that are under coordinated test model study by the Joint Video Exploration Team (WET) of ITU-T VCEG and ISO/IEC MPEG as potential enhanced video coding technology beyond the capabilities of HEVC. The deblocking filter currently used in VTM 2.0 is the same as in HEVC.

At present, the deblocking often leads to an over-smoothing or blurring, especially of regions not directly beside the block edges. This leads to a sub-optimally low deblocking quality.

SUMMARY

In view of the above-mentioned challenges, the present disclosure aims to improve the conventional deblocking filtering. The present disclosure has the objective to provide an image processing device that can perform deblocking filtering with optimized quality. Further, the deblocking should be efficient and accurate.

Embodiments of the disclosure are defined by the features of the independent claims, and further advantageous implementations of the embodiments are defined by the features of the dependent claims.

According to a first embodiment of the disclosure, an image processing device for use in an image encoder and/or an image decoder, for deblocking a block edge between a first coding block and a second coding block of an image encoded with a block code, is provided. The image processing device comprises a filter for filtering the block edge, configured to, for at least some of the pixels to be filtered, within a deblocking range from the block edge, the deblocking range being perpendicular to the block edge, determine a filtered pixel value from an original pixel value of the pixel and at least one further pixel value, determine a clipping value of the pixel, dependent upon a distance of the pixel from the block edge, and clip the filtered pixel value, using the clipping value, resulting in a deblocked pixel value. This reduces the effect of over-smoothing or blurring, greatly increasing the quality of deblocking. The image processing device may include processing circuitry for performing the operations described in this disclosure. The processing circuitry may comprise hardware and software. The processing circuitry may comprise, for example, one or more processors and a non-volatile memory carrying program code for execution by the one or more processors. The program code when executed by the one or more processors prompts the image processing device to perform the respective operations.

Advantageously, the clipping value is a maximum allowed amount of change between the original pixel value and the deblocked pixel value. This further limits the over-smoothing or blurring.

Further advantageously, the clipping of the filtered pixel value, using the clipping value, resulting in the deblocked pixel value, comprises setting the deblocked pixel value to the filtered pixel value if the absolute value of the difference between the filtered pixel value and the deblocked pixel value does not exceed the clipping value of the pixel, setting the deblocked pixel value to the original pixel value plus the clipping value of the pixel if the filtered pixel value exceeds the original pixel value plus the clipping value, and setting the deblocked pixel value to the original pixel value minus the clipping value of the pixel if the filtered pixel value is lower than the original pixel value minus the clipping value. This further increases deblocking quality.

Advantageously, the filter is adapted to determine the clipping value of the pixel dependent upon a distance of the pixel from the block edge, by using a function or a look-up table. This allows for a very accurate setting of the clipping value and thereby allows for an even further increase of the deblocking quality.

Further advantageously, the filter is adapted to determine the clipping value of the pixel dependent upon a distance of the pixel from the block edge, by using a function, which monotonously decreases with increasing distance of the pixel from the block edge. This significantly reduces the effect of over-smoothing or blurring with increasing distance from the block edge and thereby increases the deblocking quality.

Advantageously, the function is an exponential function. This leads to an especially high deblocking quality.

Preferably, the function then is $$tc'=tc+(tc>>i),$$

wherein tc' is the clipping value,
wherein tc is a constant value,
wherein i is the distance of the pixel from the block edge (403, 800), and
wherein >> signifies a right shift. This allows for a simple calculation of the exponential function.

Another alternative exponential function which can be used is as follows:

$$tc'=((2*tc)>>i),$$

wherein tc' is the clipping value,
wherein tc is a constant value,
wherein i is the distance of the pixel from the block edge (403, 800), and
wherein >> signifies a right shift. This allows for a simple calculation of the exponential function.

Alternatively, the function is a linear function. This allows for an increase in deblocking quality, while at the same time keeping the computational complexity at a minimum.

Advantageously, the function then is $$tc'=tc+(tc-(i*x),$$

wherein tc' is the clipping value,
wherein tc is a constant value,
wherein i is the distance of the pixel from the block edge (403, 800), and
wherein x is a constant value. This allows for an especially simple calculation of the linear function.

Preferably, the filter is adapted to, for each pixel to be filtered, within the deblocking range from the block edge, the deblocking range being perpendicular to the block edge, determine the filtered pixel value from the original pixel value of the pixel and the at least one further pixel value, determine the clipping value of the pixel dependent upon the distance of the pixel from the block edge, and clipping the filtered pixel value, using the clipping value, resulting in the deblocked pixel value. By using the same calculation for each pixel to be filtered, an especially simple implementation is achieved.

Alternatively, the filter is adapted to determine if a block edge needs to be filtered based upon a number of decision pixel lines being lower than a number of pixel lines in the block surrounding the block edge, in case of a vertical block edge, and upon a number of decision pixel rows being lower than a number of pixel rows in the block surrounding the block edge, in case of a horizontal block edge. The filter is then adapted to, for each pixel to be filtered, not in a decision pixel row or decision pixel line, within a deblocking range from the block edge, the deblocking range being perpendicular to the block edge, determine the filtered pixel value from the original pixel value of the pixel and the at least one further pixel value, determine the clipping value of the pixel dependent upon the distance of the pixel from the block edge, and clipping the filtered pixel value, using the clipping value, resulting in the deblocked pixel value. The filter is moreover adapted to, for each pixel to be filtered, in a decision pixel row or decision pixel line, within a deblocking range from the block edge, the deblocking range being perpendicular to the block edge, determine the filter pixel value from the original pixel value of the pixel and the at least one further pixel value, and clip the filtered pixel value using a constant clipping value, resulting in the deblocked pixel value. This means that pixels within the decision pixel rows and lines are filtered using a fixed clipping value, while at the same time pixel values not in the decision rows or lines are filtered using a range-dependent clipping value. This further increases deblocking quality at the cost of an increased computational complexity.

Advantageously, the filter has a filter tap length of 1, or at least two, or at least three, or at least four, or at least five, or at least six, or at least seven, or at least eight, or at least nine, or at least ten, or at least eleven, or at least twelve, or at least thirteen, or at least fourteen, or at least fifteen, or at least sixteen pixels. This allows for an application of the disclosure to a wide variety of different filter designs.

According to a second aspect of the disclosure, an encoder for encoding an image comprising an image processing device according to the first aspect of the disclosure is provided.

According to a third aspect of the disclosure, a decoder for decoding an image, comprising an image processing device, according to the first aspect of the disclosure is provided.

According to a fourth aspect of the disclosure, a deblocking method for deblocking a block edge between a first coding block and a second coding block of an image encoded with a block code is provided. The method comprises, for at least some of the pixels to be filtered, within a deblocking range from the block edge, the deblocking range being perpendicular to the block edge, determining a filtered pixel value from an original pixel value of the pixel and at least one further pixel value, determining a clipping value of the pixel, dependent upon a distance of the pixel from the block edge, and clipping the filtered pixel value using the clipping value, resulting in a deblocked pixel value. This reduces the effect of over-smoothing or blurring, greatly increasing the quality of deblocking.

According to a fifth aspect of the disclosure, an encoding method for encoding an image, comprising a deblocking method of the fourth aspect of the disclosure is provided.

According to a sixth aspect of the disclosure, a decoding method for decoding an image, comprising a deblocking method according to the fourth aspect of the disclosure is provided.

Finally, according to a seventh aspect of the disclosure, a computer program with a program code for performing the method according to the fourth aspect, the fifth aspect, or the sixth aspect of the disclosure, when the computer program runs on a computer, is provided.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the disclosure are described in more detail with reference to the attached figures and drawings, in which.

In the following, identical reference signs refer to identical or at least functionally equivalent features. In part, different reference signs referring to the same entities have been used in different figures.

DETAILED DESCRIPTION

Figure 1:
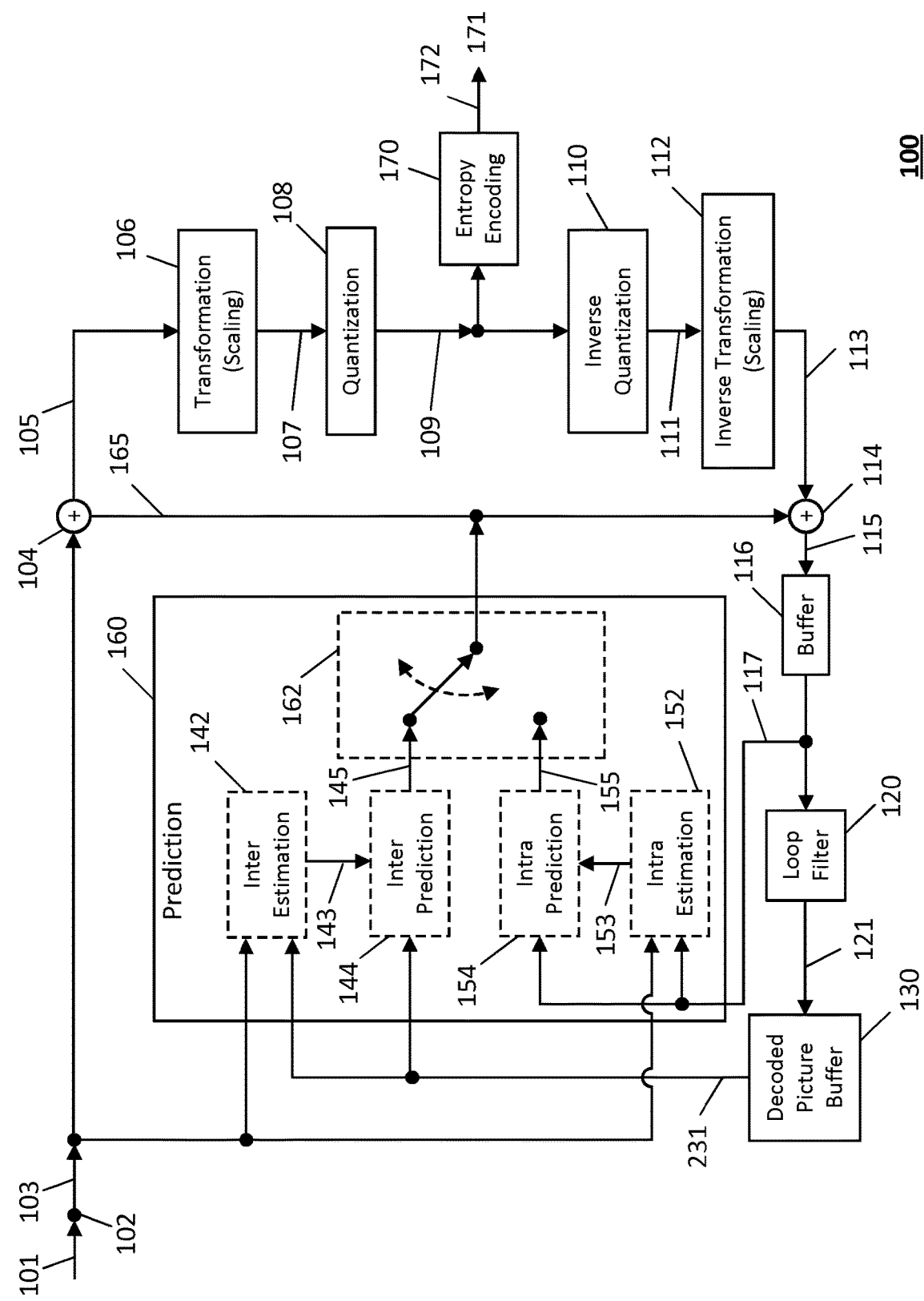
FIG. 1 is a block diagram showing an example of a video encoder configured to implement embodiments of the disclosure.
Figure 2:
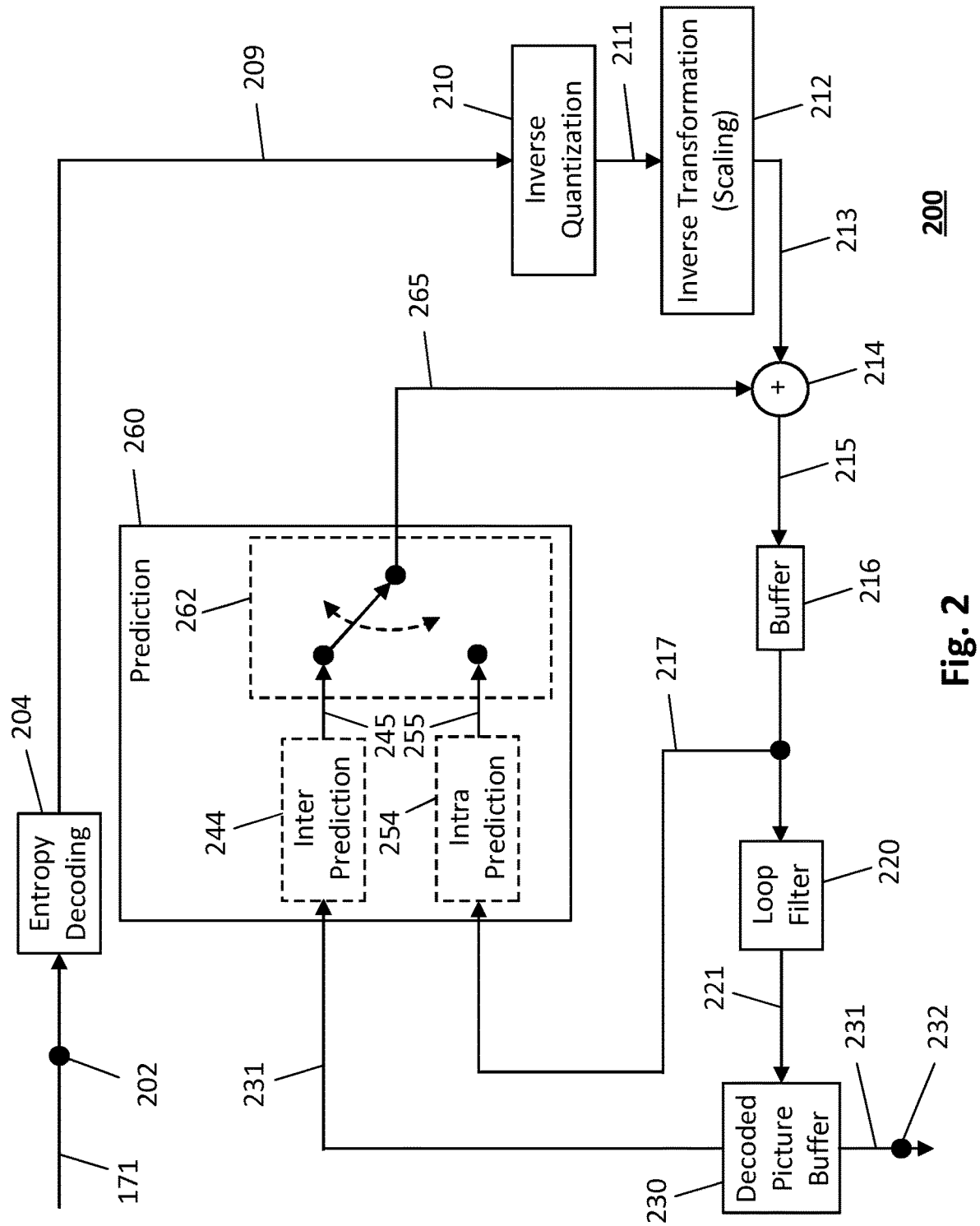
FIG. 2 is a block diagram showing an example of a video decoder configured to implement embodiments of the disclosure.
Figure 3:
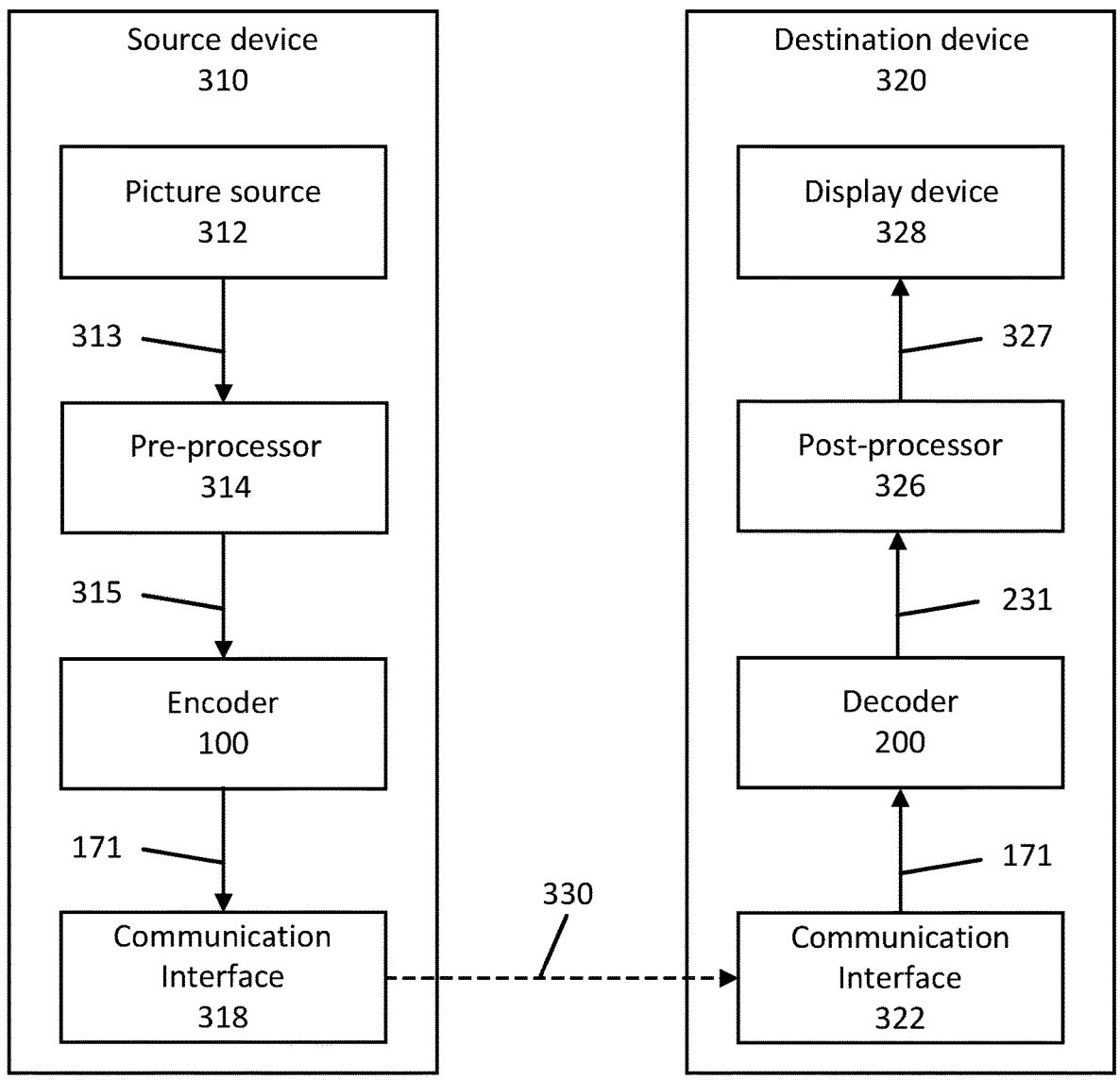
FIG. 3 is a block diagram showing an example of a video coding system configured to implement embodiments of the disclosure.
Figure 4:
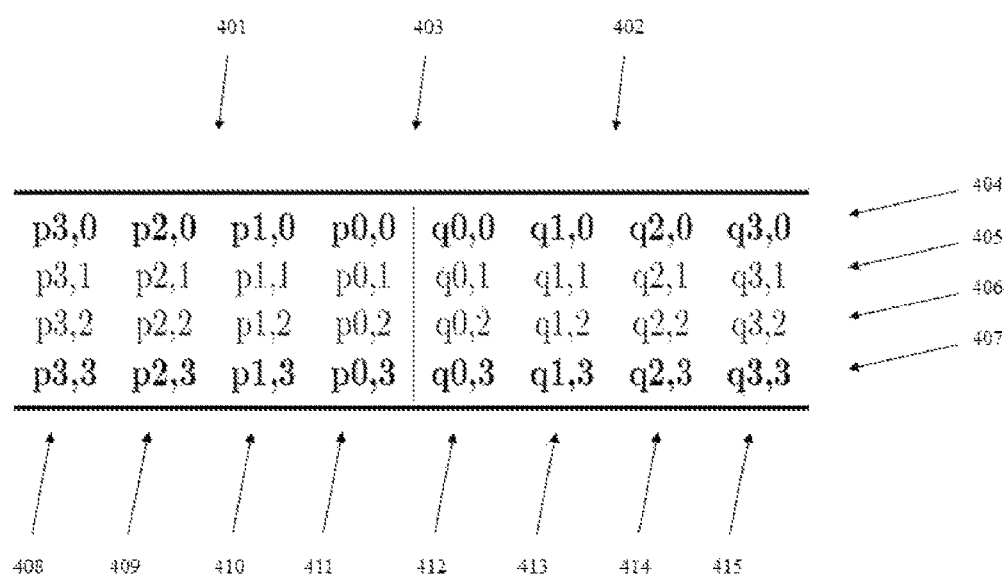
FIG. 4 shows two exemplary coding blocks.

First, we demonstrate the general concept of image coding in FIGS. 1-3. In FIG. 4 and FIG. 8, a disadvantage of a conventional deblocking filter is shown. With regard to FIGS. 5-7, the construction and function of different embodiments of the apparatus are shown and described. Finally, with regard to FIG. 9, an embodiment of the method is shown and described. Similar entities and reference numbers in different figures have been partially omitted.

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term picture the terms frame or image may be used as synonyms in the field of video coding. Video coding comprises two parts, video encoding and video decoding. Video encoding is performed at the source side, typically comprising processing (e.g., by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to both, "encoding" and "decoding" of video pictures. The combination of the encoding part and the decoding part is also referred to as CODEC (COding and DECoding).

In the case of lossless video coding, the original video pictures can be reconstructed, i.e. the reconstructed video pictures have the same quality as the original video pictures (assuming no transmission loss or other data loss during storage or transmission). In the case of lossy video coding, further compression, e.g., by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g., by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g., intra- and inter predictions) and/or re-constructions for processing, i.e. coding, the subsequent blocks.

As video picture processing (also referred to as moving picture processing) and still picture processing (the term processing comprising coding), share many concepts and technologies or tools, in the following the term "picture" is used to refer to a video picture of a video sequence (as explained above) and/or to a still picture to avoid unnecessary repetitions and distinctions between video pictures and still pictures, where not necessary. In case the description refers to still pictures (or still images) only, the term "still picture" shall be used.

In the following embodiments of an encoder 100, a decoder 200 and a coding system 300 are described based on FIGS. 1 to 3 before describing embodiments of the disclosure in more detail based on FIGS. 4-14.

FIG. 3 is a conceptual or schematic block diagram illustrating an embodiment of a coding system 300, e.g., a picture coding system 300, wherein the coding system 300 comprises a source device 310 configured to provide encoded data 330, e.g., an encoded picture 330, e.g., to a destination device 320 for decoding the encoded data 330.

The source device 310 comprises an encoder 100 or encoding unit 100, and may additionally, i.e. optionally, comprise a picture source 312, a pre-processing unit 314, e.g., a picture pre-processing unit 314, and a communication interface or communication unit 318.

The picture source 312 may comprise or be any kind of picture capturing device, for example for capturing a real-world picture, and/or any kind of a picture generating device, for example a computer-graphics processor for generating a computer animated picture, or any kind of device for obtaining and/or providing a real-world picture, a computer animated picture (e.g., a screen content, a virtual reality (VR) picture) and/or any combination thereof (e.g., an augmented reality (AR) picture). In the following, all these kinds of pictures and any other kind of picture will be referred to as "picture" or "image", unless specifically described otherwise, while the previous explanations with regard to the term "picture" covering "video pictures" and "still pictures" still hold true, unless explicitly specified differently.

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RGB format or color space a picture comprises a corresponding red, green and blue sample array. However, in video coding each pixel is typically represented in a luminance/chrominance format or color space, e.g., YCbCr, which comprises a luminance component indicated by Y (sometimes also L is used instead) and two chrominance components indicated by Cb and Cr. The luminance (or short luma) component Y represents the brightness or grey level intensity (e.g., like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 312 may be, for example a camera for capturing a picture, a memory, e.g., a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g., integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g., a wired or wireless interface, an optical interface, according to any proprietary or standardized interface protocol. The interface for obtaining the picture data 312 may be the same interface as or a part of the communication interface 318.

In distinction to the pre-processing unit 314 and the processing performed by the pre-processing unit 314, the picture or picture data 313 may also be referred to as raw picture or raw picture data 313.

Pre-processing unit 314 is configured to receive the (raw) picture data 313 and to perform pre-processing on the picture data 313 to obtain a pre-processed picture 315 or pre-processed picture data 315. Pre-processing performed by the pre-processing unit 314 may, e.g., comprise trimming, color format conversion (e.g., from RGB to YCbCr), color correction, or de-noising.

The encoder 100 is configured to receive the pre-processed picture data 315 and provide encoded picture data 171 (further details will be described, e.g., based on FIG. 1).

Communication interface 318 of the source device 310 may be configured to receive the encoded picture data 171 and to directly transmit it to another device, e.g., the destination device 320 or any other device, for storage or direct reconstruction, or to process the encoded picture data 171 for respectively before storing the encoded data 330 and/or transmitting the encoded data 330 to another device, e.g., the destination device 320 or any other device for decoding or storing.

The destination device 320 comprises a decoder 200 or decoding unit 200, and may additionally, i.e. optionally, comprise a communication interface or communication unit 322, a post-processing unit 326 and a display device 328.

The communication interface 322 of the destination device 320 is configured receive the encoded picture data 171 or the encoded data 330, e.g., directly from the source device 310 or from any other source, e.g., a memory, e.g., an encoded picture data memory.

The communication interface 318 and the communication interface 322 may be configured to transmit and respectively receive the encoded picture data 171 or encoded data 330 via a direct communication link between the source device 310 and the destination device 320, e.g., a direct wired or wireless connection, or via any kind of network, e.g., a wired or wireless network or any combination thereof, or any kind of private and public network, or any kind of combination thereof.

The communication interface 318 may be, e.g., configured to package the encoded picture data 171 into an appropriate format, e.g., packets, for transmission over a communication link or communication network, and may further comprise data loss protection and data loss recovery.

The communication interface 322, forming the counterpart of the communication interface 318, may be, e.g., configured to de-package the encoded data 330 to obtain the encoded picture data 171 and may further be configured to perform data loss protection and data loss recovery, e.g., comprising error concealment.

Communication interface 318 and communication interface 322 may both be configured as unidirectional communication interfaces as indicated by the arrow for the encoded picture data 330 in FIG. 3 pointing from the source device 310 to the destination device 320, or bi-directional communication interfaces, and may be configured, e.g., to send and receive messages, e.g., to set up a connection, to acknowledge and/or re-send lost or delayed data including picture data, and exchange any other information related to the communication link and/or data transmission, e.g., encoded picture data transmission.

The decoder 200 is configured to receive the encoded picture data 171 and provide decoded picture data 231 or a decoded picture 231 (further details will be described, e.g., based on FIG. 2).

The post-processor 326 of destination device 320 is configured to post-process the decoded picture data 231, e.g., the decoded picture 231, to obtain post-processed picture data 327, e.g., a post-processed picture 327. The post-processing performed by the post-processing unit 326 may comprise, e.g., color format conversion (e.g., from YCbCr to RGB), color correction, trimming, or re-sampling, or any other processing, e.g., for preparing the decoded picture data 231 for display, e.g., by display device 328.

The display device 328 of the destination device 320 is configured to receive the post-processed picture data 327 for displaying the picture, e.g., to a user or viewer. The display device 328 may be or comprise any kind of display for representing the reconstructed picture, e.g., an integrated or external display or monitor. The displays may, e.g., comprise cathode ray tubes (CRT), liquid crystal displays (LCD), plasma displays, organic light emitting diodes (OLED) displays or any kind of other display . . . beamer, hologram (3D), . . . .

Although FIG. 3 depicts the source device 310 and the destination device 320 as separate devices, embodiments of devices may also comprise both or both functionalities, the source device 310 or corresponding functionality and the destination device 320 or corresponding functionality. In such embodiments the source device 310 or corresponding functionality and the destination device 320 or corresponding functionality may be implemented using the same hardware and/or software or by separate hardware and/or software or any combination thereof.

As will be apparent for the skilled person based on the description, the existence and (exact) split of functionalities of the different units or functionalities within the source device 310 and/or destination device 320 as shown in FIG. 3 may vary depending on the actual device and application.

Therefore, the source device 310 and the destination device 320 as shown in FIG. 3 are merely example embodiments of the disclosure and embodiments of the disclosure are not limited to those shown in FIG. 3.

Source device 310 and destination device 320 may comprise any of a wide range of devices, including any kind of handheld or stationary devices, e.g., notebook or laptop computers, mobile phones, smart phones, tablets or tablet computers, cameras, desktop computers, set-top boxes, televisions, display devices, digital media players, video gaming consoles, video streaming devices, broadcast receiver device, or the like (also servers and work-stations for large scale professional encoding/decoding, e.g., network entities) and may use no or any kind of operating system.

FIG. 1 shows a schematic/conceptual block diagram of an embodiment of an encoder 100, e.g., a picture encoder 100, which comprises an input 102, a residual calculation unit 104, a transformation unit 106, a quantization unit 108, an inverse quantization unit 110, and inverse transformation unit 112, a reconstruction unit 114, a buffer 118, a loop filter 120, a decoded picture buffer (DPB) 130, a prediction unit 160 (comprising an inter estimation unit 142, an inter prediction unit 144, an intra-estimation unit 152, and an intra-prediction unit 154), a mode selection unit 162, an entropy encoding unit 170, and an output 172. A video encoder 100 as shown in FIG. 1 may also be referred to as hybrid video encoder or a video encoder according to a hybrid video codec.

For example, the residual calculation unit 104, the transformation unit 106, the quantization unit 108, and the entropy encoding unit 170 form a forward signal path of the encoder 100, whereas, for example, the inverse quantization unit 110, the inverse transformation unit 112, the reconstruction unit 114, the buffer 118, the loop filter 120, the decoded picture buffer (DPB) 130, the inter prediction unit 144, and the intra-prediction unit 154 form a backward signal path of the encoder, wherein the backward signal path of the encoder corresponds to the signal path of the decoder (see decoder 200 in FIG. 2).

The encoder is configured to receive, e.g., by input 102, a picture 101 or a picture block 103 of the picture 101, e.g., picture of a sequence of pictures forming a video or video sequence. The picture block 103 may also be referred to as current picture block or picture block to be coded, and the picture 101 as current picture or picture to be coded (in particular in video coding to distinguish the current picture from other pictures, e.g., previously encoded and/or decoded pictures of the same video sequence, i.e. the video sequence which also comprises the current picture).

Embodiments of the encoder 100 may comprise a partitioning unit (not depicted in FIG. 1), e.g., which may also be referred to as picture partitioning unit, configured to partition the picture 103 into a plurality of blocks, e.g., blocks like block 103, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

Like the picture 101, the block 103 again is or can be regarded as a two-dimensional array or matrix of samples with intensity values (sample values), although of smaller dimension than the picture 101. In other words, the block 103 may comprise, e.g., one sample array (e.g., a luma array in case of a monochrome picture 101) or three sample arrays (e.g., a luma and two chroma arrays in case of a color picture 101) or any other number and/or kind of arrays depending on the color format applied. The number of samples in horizontal and vertical direction (or axis) of the block 103 define the size of block 103.

Encoder 100 as shown in FIG. 1 is configured encode the picture 101 block by block, e.g., the encoding and prediction is performed per block 103.

The residual calculation unit 104 is configured to calculate a residual block 105 based on the picture block 103 and a prediction block 165 (further details about the prediction block 165 are provided later), e.g., by subtracting sample values of the prediction block 165 from sample values of the picture block 103, sample by sample (pixel by pixel) to obtain the residual block 105 in the sample domain.

The transformation unit 106 is configured to apply a transformation, e.g., a spatial frequency transform or a linear spatial transform, e.g., a discrete cosine transform (DCT) or discrete sine transform (DST), on the sample values of the residual block 105 to obtain transformed coefficients 107 in a transform domain. The transformed coefficients 107 may also be referred to as transformed residual coefficients and represent the residual block 105 in the transform domain.

The transformation unit 106 may be configured to apply integer approximations of DCT/DST, such as the core transforms specified for HEVC/H.265. Compared to an orthonormal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transformed coefficients, tradeoff between accuracy and implementation costs, etc. Specific scaling factors are, for example, specified for the inverse transform, e.g., by inverse transformation unit 212, at a decoder 200 (and the corresponding inverse transform, e.g., by inverse transformation unit 112 at an encoder 100) and corresponding scaling factors for the forward transform, e.g., by transformation unit 106, at an encoder 100 may be specified accordingly.

The quantization unit 108 is configured to quantize the transformed coefficients 107 to obtain quantized coefficients 109, e.g., by applying scalar quantization or vector quantization. The quantized coefficients 109 may also be referred to as quantized residual coefficients 109. For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse de-quantization, e.g., by inverse quantization 110, may include multiplication by the quantization step size.

Embodiments according to HEVC, may be configured to use a quantization parameter to determine the quantization step size. Generally, the quantization step size may be calculated based on a quantization parameter using a fixed point approximation of an equation including division. Additional scaling factors may be introduced for quantization and de-quantization to restore the norm of the residual block, which might be modified because of the scaling used in the fixed point approximation of the equation for quantization step size and quantization parameter. In one example implementation, the scaling of the inverse transform and de-quantization might be combined. Alternatively, customized quantization tables may be used and signaled from an encoder to a decoder, e.g., in a bit-stream. The quantization is a lossy operation, wherein the loss increases with increasing quantization step sizes.

Embodiments of the encoder 100 (or respectively of the quantization unit 108) may be configured to output the quantization scheme and quantization step size, e.g., by means of the corresponding quantization parameter, so that a decoder 200 may receive and apply the corresponding inverse quantization. Embodiments of the encoder 100 (or quantization unit 108) may be configured to output the quantization scheme and quantization step size, e.g., directly or entropy encoded via the entropy encoding unit 170 or any other entropy coding unit.

The inverse quantization unit 110 is configured to apply the inverse quantization of the quantization unit 108 on the quantized coefficients to obtain de-quantized coefficients 111, e.g., by applying the inverse of the quantization scheme applied by the quantization unit 108 based on or using the same quantization step size as the quantization unit 108. The de-quantized coefficients 111 may also be referred to as de-quantized residual coefficients 111 and correspond—although typically not identical to the transformed coefficients due to the loss by quantization—to the transformed coefficients 108.

The inverse transformation unit 112 is configured to apply the inverse transformation of the transformation applied by the transformation unit 106, e.g., an inverse discrete cosine transform (DCT) or inverse discrete sine transform (DST), to obtain an inverse transformed block 113 in the sample domain. The inverse transformed block 113 may also be referred to as inverse transformed de-quantized block 113 or inverse transformed residual block 113.

The reconstruction unit 114 is configured to combine the inverse transformed block 113 and the prediction block 165 to obtain a reconstructed block 115 in the sample domain, e.g., by sample wise adding the sample values of the decoded residual block 113 and the sample values of the prediction block 165.

The buffer unit 116 (or short "buffer" 116), e.g., a line buffer 116, is configured to buffer or store the reconstructed block and the respective sample values, for example for intra estimation and/or intra prediction. In further embodiments, the encoder may be configured to use unfiltered reconstructed blocks and/or the respective sample values stored in buffer unit 116 for any kind of estimation and/or prediction.

Embodiments of the encoder 100 may be configured such that, e.g., the buffer unit 116 is not only used for storing the reconstructed blocks 115 for intra estimation 152 and/or intra prediction 154 but also for the loop filter unit 120 (not shown in FIG. 1), and/or such that, e.g., the buffer unit 116 and the decoded picture buffer unit 130 form one buffer. Further embodiments may be configured to use filtered blocks 121 and/or blocks or samples from the decoded picture buffer 130 (both not shown in FIG. 1) as input or basis for intra estimation 152 and/or intra prediction 154.

The loop filter unit 120 (or "loop filter" 120 for short) is configured to filter the reconstructed block 115 to obtain a filtered block 121, e.g., by applying a de-blocking sample-adaptive offset (SAO) filter or other filters, e.g., sharpening or smoothing filters or collaborative filters. The filtered block 121 may also be referred to as filtered reconstructed block 121. The loop filter 120 is in the following also referred to as a deblocking filter.

Embodiments of the loop filter unit 120 may comprise (not shown in FIG. 1) a filter analysis unit and the actual filter unit, wherein the filter analysis unit is configured to determine loop filter parameters for the actual filter. The filter analysis unit may be configured to apply fixed predetermined filter parameters to the actual loop filter, adaptively select filter parameters from a set of predetermined filter parameters or adaptively calculate filter parameters for the actual loop filter.

Embodiments of the loop filter unit 120 may comprise (not shown in FIG. 1) one or a plurality of filters (loop filter components/subfilters), e.g., one or more of different kinds or types of filters, e.g., connected in series or in parallel or in any combination thereof, wherein each of the filters may comprise individually or jointly with other filters of the plurality of filters a filter analysis unit to determine the respective loop filter parameters, e.g., as described in the previous paragraph.

Embodiments of the encoder 100 (respectively loop filter unit 120) may be configured to output the loop filter parameters, e.g., directly or entropy encoded via the entropy encoding unit 170 or any other entropy coding unit, so that, e.g., a decoder 200 may receive and apply the same loop filter parameters for decoding.

The decoded picture buffer (DPB) 130 is configured to receive and store the filtered block 121. The decoded picture buffer 130 may be further configured to store other previously filtered blocks, e.g., previously reconstructed and filtered blocks 121, of the same current picture or of different pictures, e.g., previously reconstructed pictures, and may provide complete previously reconstructed, i.e. decoded, pictures (and corresponding reference blocks and samples) and/or a partially reconstructed current picture (and corresponding reference blocks and samples), for example for inter estimation and/or inter prediction.

Further embodiments of the disclosure may also be configured to use the previously filtered blocks and corresponding filtered sample values of the decoded picture buffer 130 for any kind of estimation or prediction, e.g., intra and inter estimation and prediction.

The prediction unit 160, also referred to as block prediction unit 160, is configured to receive or obtain the picture block 103 (current picture block 103 of the current picture 101) and decoded or at least reconstructed picture data, e.g., reference samples of the same (current) picture from buffer 116 and/or decoded picture data 231 from one or a plurality of previously decoded pictures from decoded picture buffer 130, and to process such data for prediction, i.e. to provide a prediction block 165, which may be an inter-predicted block 145 or an intra-predicted block 155.

The mode selection unit 162 may be configured to select a prediction mode (e.g., an intra or inter prediction mode) and/or a corresponding prediction block 145 or 155 to be used as prediction block 165 for the calculation of the residual block 105 and for the reconstruction of the reconstructed block 115.

Embodiments of the mode selection unit 162 may be configured to select the prediction mode (e.g., from those supported by prediction unit 160), which provides the best match or in other words the minimum residual (minimum residual means better compression for transmission or storage), or a minimum signaling overhead (minimum signaling overhead means better compression for transmission or storage), or which considers or balances both. The mode selection unit 162 may be configured to determine the prediction mode based on rate distortion optimization (RDO), i.e. select the prediction mode which provides a minimum rate distortion optimization or which associated rate distortion at least a fulfills a prediction mode selection criterion.

In the following the prediction processing (e.g., prediction unit 160 and mode selection (e.g., by mode selection unit 162) performed by an example encoder 100 will be explained in more detail.

As described above, encoder 100 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 32 different intra-prediction modes, e.g., non-directional modes like DC (or mean) mode and planar mode, or directional modes, e.g., as defined in H.264, or may comprise 65 different intra-prediction modes, e.g., non-directional modes like DC (or mean) mode and planar mode, or directional modes, e.g., as defined in H.265.

The set of (or possible) inter-prediction modes depend on the available reference pictures (i.e. previous at least partially decoded pictures, e.g., stored in DBP 230) and other inter-prediction parameters, e.g., whether the whole reference picture or only a part, e.g., a search window area around the area of the current block, of the reference picture is used for searching for a best matching reference block, and/or e.g., whether pixel interpolation is applied, e.g., half/semi-pel and/or quarter-pel interpolation, or not.

Additionally to the above prediction modes, skip mode and/or direct mode may be applied.

The prediction unit 160 may be further configured to partition the block 103 into smaller block partitions or sub-blocks, e.g., iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 103 and the prediction modes applied to each of the block partitions or sub-blocks.

The inter estimation unit 142, also referred to as inter picture estimation unit 142, is configured to receive or obtain the picture block 103 (current picture block 103 of the current picture 101) and a decoded picture 231, or at least one or a plurality of previously reconstructed blocks, e.g., reconstructed blocks of one or a plurality of other/different previously decoded pictures 231, for inter estimation (or "inter picture estimation"). E.g., a video sequence may comprise the current picture and the previously decoded pictures 231, or in other words, the current picture and the previously decoded pictures 231 may be part of or form a sequence of pictures forming a video sequence.

The encoder 100 may, e.g., be configured to select a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter estimation parameters 143 to the inter prediction unit 144. This offset is also called motion vector (MV). The inter estimation is also referred to as motion estimation (ME) and the inter prediction also motion prediction (MP).

The inter prediction unit 144 is configured to obtain, e.g., receive, an inter prediction parameter 143 and to perform inter prediction based on or using the inter prediction parameter 143 to obtain an inter prediction block 145.

Although FIG. 1 shows two distinct units (or steps) for the inter-coding, namely inter estimation 142 and inter prediction 152, both functionalities may be performed as one (inter estimation) requires/comprises calculating an/the inter prediction block, i.e. the or a "kind of" inter prediction 154), e.g., by testing all possible or a predetermined subset of possible inter-prediction modes iteratively while storing the currently best inter prediction mode and respective inter prediction block, and using the currently best inter prediction mode and respective inter prediction block as the (final) inter prediction parameter 143 and inter prediction block 145 without performing another time the inter prediction 144.

The intra estimation unit 152 is configured to obtain, e.g., receive, the picture block 103 (current picture block) and one or a plurality of previously reconstructed blocks, e.g., reconstructed neighbor blocks, of the same picture for intra estimation. The encoder 100 may, e.g., be configured to select an intra prediction mode from a plurality of (predetermined) intra prediction modes and provide it as intra estimation parameter 153 to the intra prediction unit 154.

Embodiments of the encoder 100 may be configured to select the intra-prediction mode based on an optimization criterion, e.g., minimum residual (e.g., the intra-prediction mode providing the prediction block 155 most similar to the current picture block 103) or minimum rate distortion.

The intra prediction unit 154 is configured to determine based on the intra prediction parameter 153, e.g., the selected intra prediction mode 153, the intra prediction block 155.

Although FIG. 1 shows two distinct units (or steps) for the intra-coding, namely intra estimation 152 and intra prediction 154, both functionalities may be performed as one (intra estimation) requires/comprises calculating the intra prediction block, i.e. the or a "kind of" intra prediction 154), e.g., by testing all possible or a predetermined subset of possible intra-prediction modes iteratively while storing the currently best intra prediction mode and respective intra prediction block, and using the currently best intra prediction mode and respective intra prediction block as the (final) intra prediction parameter 153 and intra prediction block 155 without performing another time the intra prediction 154.

The entropy encoding unit 170 is configured to apply an entropy encoding algorithm or scheme (e.g., a variable length coding (VLC) scheme, an context adaptive VLC scheme (CALVC), an arithmetic coding scheme, a context adaptive binary arithmetic coding (CABAC)) on the quantized residual coefficients 109, inter prediction parameters 143, intra prediction parameter 153, and/or loop filter parameters, individually or jointly (or not at all) to obtain encoded picture data 171 which can be output by the output 172, e.g., in the form of an encoded bit-stream 171.

FIG. 2 shows an exemplary video decoder 200 configured to receive encoded picture data (e.g., encoded bit-stream) 171, e.g., encoded by encoder 100, to obtain a decoded picture 231.

The decoder 200 comprises an input 202, an entropy decoding unit 204, an inverse quantization unit 210, an inverse transformation unit 212, a reconstruction unit 214, a buffer 216, a loop filter 220, a decoded picture buffer 230, a prediction unit 260, an inter prediction unit 244, an intra prediction unit 254, a mode selection unit 260 and an output 232.

The entropy decoding unit 204 is configured to perform entropy decoding to the encoded picture data 171 to obtain, e.g., quantized coefficients 209 and/or decoded coding parameters (not shown in FIG. 2), e.g., (decoded) any or all of inter prediction parameters 143, intra prediction parameter 153, and/or loop filter parameters.

In embodiments of the decoder 200, the inverse quantization unit 210, the inverse transformation unit 212, the reconstruction unit 214, the buffer 216, the loop filter 220, the decoded picture buffer 230, the prediction unit 260 and the mode selection unit 260 are configured to perform the inverse processing of the encoder 100 (and the respective functional units) to decode the encoded picture data 171.

In particular, the inverse quantization unit 210 may be identical in function to the inverse quantization unit 110, the inverse transformation unit 212 may be identical in function to the inverse transformation unit 112, the reconstruction unit 214 may be identical in function reconstruction unit 114, the buffer 216 may be identical in function to the buffer 116, the loop filter 220 may be identical in function to the loop filter 220 (with regard to the actual loop filter as the loop filter 220 typically does not comprise a filter analysis unit to determine the filter parameters based on the original image 101 or block 103 but receives (explicitly or implicitly) or obtains the filter parameters used for encoding, e.g., from entropy decoding unit 204), and the decoded picture buffer 230 may be identical in function to the decoded picture buffer 130.

The prediction unit 260 may comprise an inter prediction unit 244 and an inter prediction unit 254, wherein the inter prediction unit 144 may be identical in function to the inter prediction unit 144, and the inter prediction unit 154 may be identical in function to the intra prediction unit 154. The prediction unit 260 and the mode selection unit 262 are typically configured to perform the block prediction and/or obtain the predicted block 265 from the encoded data 171 only (without any further information about the original image 101) and to receive or obtain (explicitly or implicitly) the prediction parameters 143 or 153 and/or the information about the selected prediction mode, e.g., from the entropy decoding unit 204.

The decoder 200 is configured to output the decoded picture 230, e.g., via output 232, for presentation or viewing to a user.

Although embodiments of the disclosure have been primarily described based on video coding, it should be noted that embodiments of the encoder 100 and decoder 200 (and correspondingly the system 300) may also be configured for still picture processing or coding, i.e. the processing or coding of an individual picture independent of any preceding or consecutive picture as in video coding. In general only inter-estimation 142, inter-prediction 144, 242 are not available in case the picture processing coding is limited to a single picture 101. Most if not all other functionalities (also referred to as tools or technologies) of the video encoder 100 and video decoder 200 may equally be used for still pictures, e.g., partitioning, transformation (scaling) 106, quantization 108, inverse quantization 110, inverse transformation 112, intra-estimation 142, intra-prediction 154, 254 and/or loop filtering 120, 220, and entropy coding 170 and entropy decoding 204.

The present disclosure deals with the inner workings of the deblocking filter, also referred to as loop filter in FIG. 1 and FIG. 2.

In FIG. 4, two exemplary coding blocks 401, 402 separated by a block edge 403 are shown. The coding blocks 401, 402 comprise the pixel lines 402-407 and the pixel rows 408-415. Especially here, the block edge is a vertical block edge. In this example, the blocks have a size of 4×4 pixels. In the practice, other block sizes though can be employed.

Deblocking decisions are made separately for each segment of a block boundary.

The strong deblocking filter in HEVC is applied to smooth areas, where block artifacts are more visible. The filtering mode modifies three samples from the block boundary and enables strong low-pass filtering. A clipping operation is additionally performed for each sample. The reason for performing the clipping operation is to limit the amount of filtering in order to make sure that there is no excessive filtering on the lines which were not evaluated in the filtering decisions. As shown in FIG. 4, pixel lines 405 and 406 are not used in the decision to filter or not to filter. This is done for reasons of computational complexity. Only the decision pixel lines 404 and 407 are used here to determine of a filtering is to be performed.

In the following the functions for determining the deblocked pixel values are shown:

$$p_0'=(p_2+2p_1+2p_0+2q_0+q_1+4)>>3, \quad (7.17)$$

$$p_1'=(p_2+p_1+p_0+q_0+4)>>2, \quad (7.18)$$

$$p_2'=(2p_3+3p_2+p_1+p_0+q_0+4)>>3, \quad (7.19)$$

P0', P1', P2' are filtered pixel values corresponding to original pixel values P0, P1, and P2, respectively. The second index, as shown in FIG. 4 has been omitted here.

The symbol ">>" signifies a right shift. A right shift corresponds to a division by $2y$, where y is the amount of right shift. For example, in function 7.17, ">>3" signifies a division by 23=8.

The modified sample values are then clipped to the range [Pi−2tc, Pi+2tc], where Pi is the pixel value of the pixel i, and where tc is a constant value. The value of tc can for example be derived from a table using the average quantization parameter QP as the index into the table. Normally the higher the QP value is, the larger the tc value is.

Figure 9:
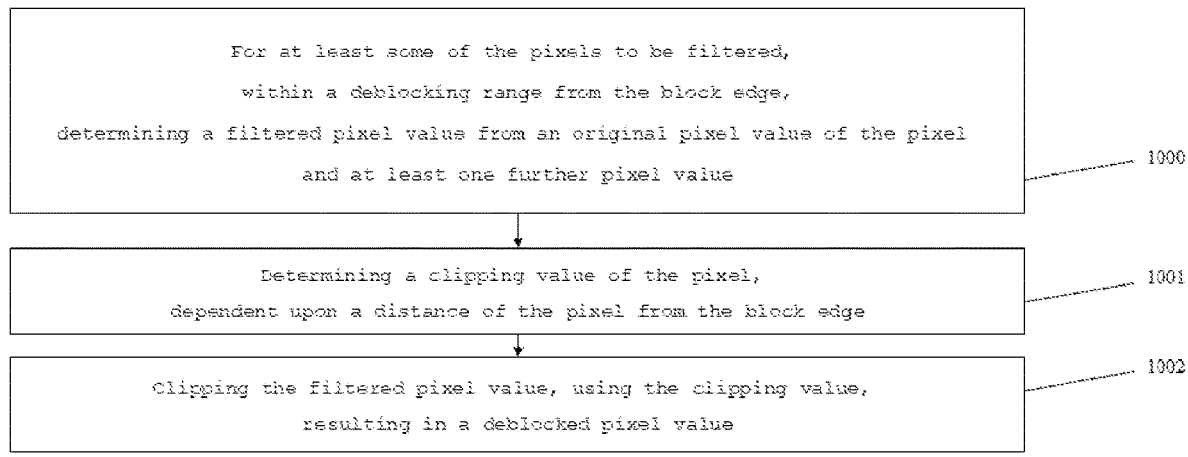
FIG. 9 shows a flow diagram of an embodiment of the image processing method according to the fourth aspect of the disclosure.

FIG. 9 depicts a typical blocking artifact at a block edge 900. It can readily be seen, that the samples P0 and Q0 have the maximum distortion and the samples further away from the block edge tend to have less distortion, e.g., samples P3 and Q3.

Since all the pixel values are clipped to the same clipping range [Pi−2tc, Pi+2tc], the pixel values far away from the block boundary, e.g., P3 and Q3 also use same clipping range and therefore are allowed to be modified within the same range as the pixel values P0 and Q0. This constant clipping range will result in samples far away from the boundary also to be modified by a large extent and therefore results in over-smoothing or blurring or sometimes even incorrect deblocking filtering with loss of meaningful image content.

Instead of using a fixed clipping range for all the pixel values, according to the present disclosure, the clipping range is made adaptive. Especially, the clipping range is made adaptive from the distance of the respective pixel from the block edge.

Advantageously, a lookup table or a function are used for determining a clipping value, by which the filtered pixel value is clipped. Preferably such a function is a monotonically decreasing function based on the distance of the pixel from the edge. The greater the distance of the sample from the edge/boundary, the smaller is the clipping value defined for the pixel. Therefore pixel values far away from the block edge are allowed to have a smaller clipping value and therefore are allowed to have a smaller deviation after clipping compared to the pixel values which are closer to the block edge. This way the amount of filtering is controlled and therefore an over-smoothing or blurring is prevented.

Advantageously, an exponential function is used for determining the clipping value. The clipping value can then be determined as $$tc'=tc+(tc>>i),$$

wherein tc' is the clipping value,
wherein tc is a constant value,
wherein i is the distance of the pixel from the block edge, and
wherein >> signifies a right shift.

This results in the following formula for the clipping of the deblocked pixel value:

$$P'a,b=(Pa,b-(tc+(tc>>i)),$$

$$Pa,b+(tc+(tc>>i))).$$

wherein
P'a, b is the deblocked pixel value of pixel a, b,
a is an integer index of the pixel row,
b is an integer index of the pixel line,
Pa, b is the original pixel value of the pixel a, b,
i is an integer distance of the pixel from the block edge For example, for P0,0 and Q0,0 clipping stays the same as explained along formulas 7.17-7.19, because the value of i is 0 (distance is 0). The clipping value is set to tc'=tc+(tc>>0)=2tc, resulting in P'0,0=(P0,0−2tc), P0,0+2tc))

For example, for P'1,0, clipping is reduced to tc'=tc+(tc>>1)=tc+tc/2=1,5 tc, resulting in P'1,0=(P1,0−1,5tc), P1,0+1,5tc)).

For example, for P'2,0, clipping is reduced to tc'=tc+(tc>>2)=tc+tc/4=1,25 tc, resulting in P'2,0=(P2,0−1,25tc), P2,0+1,25tc)).

As we can see, the clipping value is reduced gradually as the sample distance i increases from the block edge.

Another alternative exponential function which can be used is as follows:

$$tc'=((2*tc)>>i),$$

wherein tc' is the clipping value,
wherein tc is a constant value,
wherein i is the distance of the pixel from the block edge, and
wherein >> signifies a right shift.

This results in the following formula for the clipping of the deblocked pixel value:

$$P'a,b=(Pa,b-((2*tc)>>i)),$$

$$Pa,b+((2*tc)>>i))).$$

wherein
P'a, b is the deblocked pixel value of pixel a, b,
a is an integer index of the pixel row,
b is an integer index of the pixel line,
Pa, b is the original pixel value of the pixel a, b,
i is an integer distance of the pixel from the block edge.

The calculation of the exponential function, though, results in a significant computational complexity. In an alternative embodiment, a linear function can be used. In this case, the clipping value is set to $$tc'=tc+(tc-(i*x)),$$

wherein tc' is the clipping value,
wherein tc is a constant value,
wherein i is the distance of the pixel from the block edge, and
wherein x is a constant value.

This results in the deblocked pixel value to be clipped to $$P'a,b=(Pa,b-(tc+(tc-(i*x)),Pa,b+(tc+(tc-(i*x))),$$

wherein
P'a, b is the deblocked pixel value of pixel a, b,
a is an integer index of the pixel row,
b is an integer index of the pixel line,
Pa, b is the original pixel value of the pixel a, b,
i is an integer distance of the pixel from the block edge, and
x is a constant integer value.

Advantageously, x depends on the average quantization parameter QP used in the deblocking process. In general the value of x increases as the QP value increases. Also the value of x can be derived separately for 8 bit video and 10 bit video.

An example, the value of x for 10 bit video can set as follows:

| QP | | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| x | 0 | 0 | 0 | 0 | 0 | 0 | 0 | 0 | 0 | 0 | 0 | 0 | 0 | 0 | 0 | 0 | 0 | 0 |

| QP | | | | | | | | | | | | | | | | |
|---|---|---|---|---|---|---|---|---|---|---|---|---|---|---|---|---|
| | 19 | 20 | 21 | 22 | 23 | 24 | 25 | 26 | 27 | 28 | 29 | 30 | 31 | 32 | 33 | 34 | 35 |
| x | 1 | 1 | 1 | 1 | 1 | 1 | 1 | 1 | 1 | 1 | 1 | 1 | 1 | 2 | 2 | 2 | 2 |

| QP | | | | | | | | | | | | | | | | |
|---|---|---|---|---|---|---|---|---|---|---|---|---|---|---|---|---|
| | 36 | 37 | 38 | 39 | 40 | 41 | 42 | 43 | 44 | 45 | 46 | 47 | 48 | 49 | 50 | 51 | 52 |
| x | 2 | 2 | 2 | 2 | 2 | 4 | 4 | 5 | 5 | 6 | 6 | 7 | 7 | 8 | 18 | 18 |

| QP | | | | | | | | | | | | | | | |
|---|---|---|---|---|---|---|---|---|---|---|---|---|---|---|---|
| | 53 | 54 | 55 | 56 | 57 | 58 | 59 | 60 | 61 | 62 | 63 | 64 | 65 | 66 | 67 |
| x | 10 | 10 | 12 | 12 | 12 | 14 | 14 | 16 | 16 | 16 | 16 | 16 | 16 | 16 | 16 |

As an example, for average QP value of 37, the value of x is 2, and therefore the pixel values are modified as follows:

For example, for P0,0 clipping stays the same as explained along formulas 7.17-7.19, because the value of i is 0 (distance is 0). The clipping value is set to tc'=tc+(tc−(0*2))=2tc, resulting in P'0,0=(P0,0−(tc+(tc−(0*2)), P0,0+(tc+(tc−(0*2))).

For example, for P'1,0, clipping is reduced to tc'=tc+(tc−(1*2))=2tc−2, resulting in P' 1,0=(P1,0−2tc−2), P1,0+2tc−2)).

For example, for P'2,0, clipping is reduced to tc'=tc+(tc−2*2)=tc+(tc−4)=2tc−4, resulting in P'2,0=(P2,0−(2tc−4)), P2,0+(2tc−4)).

In a further advantageous embodiment, the use of the distance-dependent clipping, as shown earlier, is limited to non-decision pixel lines and non-decision pixel rows, as shown in FIG. 4. As explained before, for determining, if a filtering of a block edge is performed, a number of pixels from a decision pixel line (vertical block edge) or decision pixel row (horizontal block edge) are used. Not all pixel lines/rows within the blocks though are used to base this decision on, in order to save computational complexity. The range-dependent clipping though is only performed in the non-decision pixel lines/rows, but not in the pixel lines/rows which are decision pixel lines/rows. In the decision pixel lines/rows, the conventional clipping using a constant value is performed.

Figure 5:
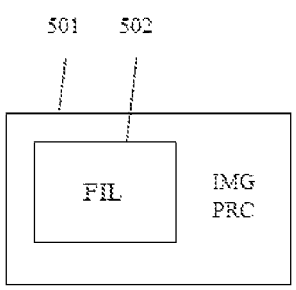
FIG. 5 shows an embodiment of the image processing device according to the first aspect of the disclosure.

In FIG. 5, an embodiment of the first aspect of the disclosure is shown. Especially, here an image processing device 501 comprising a filter 502 is shown. The filter 502 is adapted to perform the deblocking filtering, shown above.

Figure 6:
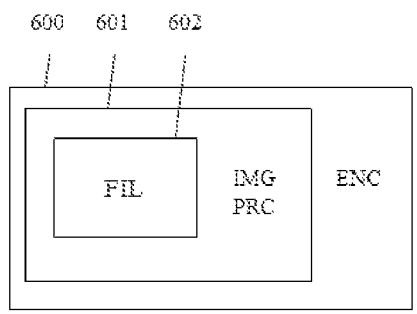
FIG. 6 shows an embodiment of the encoder according to the second aspect of the disclosure.

In FIG. 6, an embodiment of the second aspect of the disclosure is shown. Especially, here an encoder 600, comprising an image processing device 601, again comprising a filter 602 is shown. The filter 602 performs the deblocking filtering, as shown above.

Figure 7:
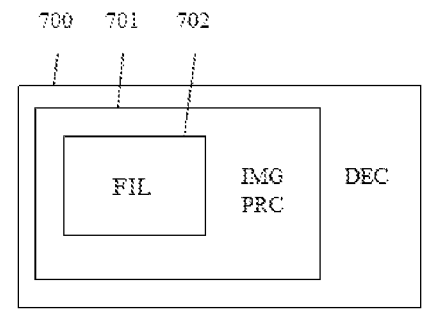
FIG. 7 shows an embodiment of the decoder according to the third aspect of the disclosure.
Figure 8:
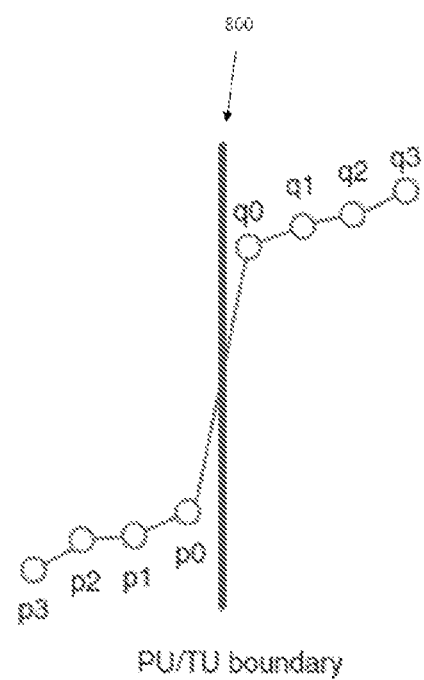
FIG. 8 shows an exemplary block edge with pixel values before deblocking filtering.

In FIG. 7, an embodiment of the third aspect of the disclosure is shown. Especially, here a decoder 700 comprising an image processing device 701 in turn comprising a filter 702 is shown. The filter 702 performs the deblocking filtering, as shown above.

Finally, in FIG. 9, an embodiment of the fifth aspect of the disclosure is shown in a flow diagram. In a first step 1000, for at least some of the pixels to be filtered, within a deblocking range from the block edge, a filtered pixel value is determined from an original pixel value of the pixel and at least one further pixel value. In a second step 1001, a clipping value of the pixel is determined dependent upon a distance of the pixel from the block edge. In a final third step 1002, the filtered pixel value is clipped using the clipping value, resulting in a deblocked pixel value.

It is pointed out that the elaborations regarding how the deblocking filtering is performed from above are also applicable to the method according to the fourth aspect of the disclosure.

It is important to note that the disclosure is not limited to the embodiments and especially not to the coding block sizes and filter tap lengths shown above. The disclosure can be applied to any coding block sizes and to any filter tap lengths.

DEFINITIONS OF ACRONYMS

CTU/CTB—Coding Tree Unit/Coding Tree Block
CU/CB—Coding Unit/Coding Block
PU/PB—Prediction Unit/Prediction Block
TU/TB—Transform Unit/Transform Block
HEVC—High Efficiency Video Coding

LISTING OF REFERENCE NUMBERS

FIG. 1
100 Encoder
103 Picture block
102 Input (e.g., input port, input interface)
104 Residual calculation [unit or step]
105 Residual block
106 Transformation (e.g., additionally comprising scaling) [unit or step]
107 Transformed coefficients
108 Quantization [unit or step]
109 Quantized coefficients
110 Inverse quantization [unit or step]
111 De-quantized coefficients
112 Inverse transformation (e.g., additionally comprising scaling) [unit or step]
113 Inverse transformed block
114 Reconstruction [unit or step]
115 Reconstructed block
116 (Line) buffer [unit or step]
117 Reference samples
120 Loop filter [unit or step]
121 Filtered block
130 Decoded picture buffer (DPB) [unit or step]

142 Inter estimation (or inter picture estimation) [unit or step]
143 Inter estimation parameters (e.g., reference picture/reference picture index, motion vector/offset)
144 Inter prediction (or inter picture prediction) [unit or step]
145 Inter prediction block
152 Intra estimation (or intra picture estimation) [unit or step]
153 Intra prediction parameters (e.g., intra prediction mode)
154 Intra prediction (intra frame/picture prediction) [unit or step]
155 Intra prediction block
162 Mode selection [unit or step]
165 Prediction block (either inter prediction block 145 or intra prediction block 155)
170 Entropy encoding [unit or step]
171 Encoded picture data (e.g., bitstream)
172 Output (output port, output interface)
231 Decoded picture
FIG. 2
200 Decoder
171 Encoded picture data (e.g., bitstream)
202 Input (port/interface)
204 Entropy decoding
209 Quantized coefficients
210 Inverse quantization
211 De-quantized coefficients
212 Inverse transformation (scaling)
213 Inverse transformed block
214 Reconstruction (unit)
215 Reconstructed block
216 (Line) buffer
217 Reference samples
220 Loop filter (in loop filter)
221 Filtered block
230 Decoded picture buffer (DPB)
231 Decoded picture
232 Output (port/interface)
244 Inter prediction (inter frame/picture prediction)
245 Inter prediction block
254 Intra prediction (intra frame/picture prediction)
255 Intra prediction block
260 Mode selection
265 Prediction block (inter prediction block 245 or intra prediction block 255)
FIG. 3
300 Coding system
310 Source device
312 Picture Source
313 (Raw) picture data
314 Pre-processor/Pre-processing unit
315 Pre-processed picture data
318 Communication unit/interface
320 Destination device
322 Communication unit/interface
326 Post-processor/Post-processing unit
327 Post-processed picture data
328 Display device/unit
330 transmitted/received/communicated (encoded) picture data
FIG. 4
401 coding block
402 coding block
403 block edge
404 pixel line
405 pixel line
406 pixel line
407 pixel line
408 pixel row
409 pixel row
410 pixel row
411 pixel row
412 pixel row
413 pixel row
414 pixel row
415 pixel row
FIG. 5
501 image processing device
502 filter
FIG. 6
600 encoder
601 image processing device
602 filter
FIG. 7
700 decoder
701 image processing device
702 filter
FIG. 8
800 block edge
FIG. 9
1000 first step
1001 second step
1002 third step Additional details of this disclosure are presented in Appendix A.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Given below is a listing of specific embodiments. Reference numbers in parentheses are to be construed as exemplary, not as limiting.

Embodiment 1

An image processing device (501, 601, 701) for use in an image encoder (600) and/or an image decoder (700), for deblocking a block edge (403, 800) between a first coding block (401) and a second coding block (402) of an image encoded with a block code, wherein the image processing device (501, 601, 701) comprises a filter (502, 602, 702) for filtering the block edge (403, 800), configured to, for at least some of the pixels to be filtered, within a deblocking range from the block edge (403, 800), the deblocking range being perpendicular to the block edge (403, 800):
- determine a filtered pixel value from an original pixel value of the pixel and at least one further pixel value,
- determine a clipping value of the pixel, dependent upon a distance of the pixel from the block edge (403, 800), and clip the filtered pixel value, using the clipping value, resulting in a deblocked pixel value.

Embodiment 2

The image processing device (501, 601, 701) of embodiment 1, wherein the clipping value is a maximum allowed amount of change between the original pixel value and the deblocked pixel value.

Embodiment 3

The image processing device (501, 601, 701) of embodiment 1 or 2, wherein the clipping of the filtered pixel value, using the clipping value, resulting in the deblocked pixel value, comprises:
- setting the deblocked pixel value to the filtered pixel value, if the absolute value of the difference between the filtered pixel value and the deblocked pixel value does not exceed the clipping value of the pixel, setting the deblocked pixel value to the original pixel value plus the clipping value of the pixel, if the filtered pixel value exceeds the original pixel value plus the clipping value, and setting the deblocked pixel value to the original pixel value minus the clipping value of the pixel, if the filtered pixel value is lower than the original pixel value minus the clipping value.

Embodiment 4

The image processing device (501, 601, 701) of any of the embodiments 1 to 3, wherein the filter (502, 602, 702) is adapted to determine the clipping value of the pixel dependent upon a distance of the pixel from the block edge (403, 800), by using a function or a lookup table.

Embodiment 5

The image processing device (501, 601, 701) of any of the embodiments 1 to 3, wherein the filter (502, 602, 702) is adapted to determine the clipping value of the pixel dependent upon a distance of the pixel from the block edge (403, 800), by using a function, which monotonically decreases with increasing distance of the pixel from the block edge (403, 800).

Embodiment 6

The image processing device (501, 601, 701) of embodiment 5, wherein the function is an exponential function.

Embodiment 7

The image processing device (501, 601, 701) of embodiment 6, wherein the function is tc'=tc+(tc>>i), wherein tc' is the clipping value, wherein tc is a constant value, wherein i is the distance of the pixel from the block edge (403, 800), and wherein >> signifies a right shift.

Embodiment 8

The image processing device (501, 601, 701) of embodiment 5, wherein the function is a linear function.

Embodiment 9

The image processing device (501, 601, 701) of embodiment 8, wherein the function is tc'=tc+(tc−(i*x)), wherein tc' is the clipping value, wherein tc is a constant value, wherein i is the distance of the pixel from the block edge (403, 800), and wherein x is a constant value.

Embodiment 10

The image processing device (501, 601, 701) of any of the embodiments 1 to 9, wherein the filter (502, 602, 702) is adapted to, for each pixel to be filtered, within the deblocking range from the block edge (403, 800), the deblocking range being perpendicular to the block edge (403, 800):
determine the filtered pixel value from the original pixel value of the pixel and the at least one further pixel value,
determine the clipping value of the pixel dependent upon the distance of the pixel from the block edge (403, 800), and
clipping the filtered pixel value, using the clipping value, resulting in the deblocked pixel value.

Embodiment 11

The image processing device (501, 601, 701) of any of the embodiments 1 to 9, wherein the filter (502, 602, 702) is adapted to, determine if a block edge (403, 800) needs to be filtered, based upon a number of decision pixel lines being lower than a number of pixel lines in the blocks surrounding the block edge (403, 800), in case of a vertical block edge (403, 800), and upon a number of decision pixel rows, being lower than a number of pixel rows in the blocks surrounding the block edge (403, 800), in case of a horizontal block edge (403, 800), wherein the filter (502, 602, 702) is adapted to, for each pixel to be filtered, not in a decision pixel row or decision pixel line, within a deblocking range from the block edge (403, 800), the deblocking range being perpendicular to the block edge (403, 800):
determine the filtered pixel value from the original pixel value of the pixel and the at least one further pixel value,
determine the clipping value of the pixel dependent upon the distance of the pixel from the block edge (403, 800),
clipping the filtered pixel value, using the clipping value, resulting in the deblocked pixel value, and
- wherein the filter (502, 602, 702) is adapted to, for each pixel to be filtered, in a decision pixel row or decision pixel line, within a deblocking range from the block edge (403, 800), the deblocking range being perpendicular to the block edge (403, 800):
  determine the filtered pixel value from the original pixel value of the pixel and the at least one further pixel value, and
clipping the filtered pixel value, using a constant clipping value, resulting in the deblocked pixel value.

Embodiment 12

The image processing device (501, 601, 701) of any of the embodiments 1 to 11, wherein the filter (502, 602, 702) has a filter tap length of 1, or at least two, or at least three, or at least four, or at least five, or at least six, or at least seven, or at least eight, or at least nine, or at least ten, or at least eleven, or at least twelve, or at least thirteen, or at least fourteen, or at least fifteen, or at least sixteen pixels.

Embodiment 13

An encoder for encoding an image, comprising an image processing device (501, 601, 701) of any of the embodiments 1 to 12.

Embodiment 14

A decoder for decoding an image, comprising an image processing device (501, 601, 701) of any of the embodiments 1 to 12.

Embodiment 15

A deblocking method for deblocking a block edge (403, 800) between a first coding block and a second coding block of an image encoded with a block code, wherein the method comprises, for at least some of the pixels to be filtered, within a deblocking range from the block edge (403, 800), the deblocking range being perpendicular to the block edge (403, 800):
determining (1000) a filtered pixel value from an original pixel value of the pixel and at least one further pixel value,
determining (1001) a clipping value of the pixel, dependent upon a distance of the pixel from the block edge (403, 800), and
clipping (1002) the filtered pixel value, using the clipping value, resulting in a deblocked pixel value.

Embodiment 16

An encoding method for encoding an image, comprising a deblocking method of embodiment 15.

Embodiment 17

A decoding method for decoding an image, comprising a deblocking method of embodiment 15.

Embodiment 18

A computer program product comprising a program code for performing the method according to any of the embodiments 15 to 17 when the computer program runs on a computer.

What is claimed is:

1. An image processing device deblocking a block edge between a first block and a second block of an image, the image processing device comprising:
at least one processor; and
one or more memories coupled to the at least one processor and storing programming instructions for execution by the at least one processor to cause the device to:
generate a filtered first pixel value from an original first pixel value of a first pixel, the first pixel being within a deblocking range from the block edge, the deblocking range comprising a number of pixels in a line perpendicular to the block edge, and the number of pixels comprises the first pixel and a second pixel;
determine a clipping value for the first pixel depending upon a distance of the first pixel from the block edge, using a lookup table;
clip the filtered first pixel value using the clipping value of the first pixel, resulting in a deblocked first pixel value;
generate a filtered second pixel value from an original second pixel value, the second pixel being within the deblocking range from the block edge; and
clip the filtered second pixel value using a constant clipping value, resulting in a deblocked second pixel value.

2. The image processing device of claim 1, wherein the clipping value is a maximum allowed amount of change between the original first pixel value and the deblocked first pixel value.

3. The image processing device of claim 1, wherein the clipping of the filtered first pixel value, using the clipping value, resulting in the deblocked first pixel value, comprises:
setting the deblocked first pixel value to the filtered first pixel value if the absolute value of a difference between the filtered first pixel value and the deblocked first pixel value does not exceed the clipping value of the first pixel,
setting the deblocked first pixel value to the original first pixel value plus the clipping value of the first pixel if the filtered first pixel value exceeds the original first pixel value plus the clipping value, and
setting the deblocked first pixel value to the original first pixel value minus the clipping value of the first pixel if the filtered first pixel value is lower than the original first pixel value minus the clipping value.

4. The image processing device of claim 1, wherein the clipping value is a monotonically decreasing function of the distance of the first pixel from the block edge.

5. The image processing device of claim 4, wherein the monotonically decreasing function is a linear function.

6. The image processing device of claim 5, wherein the linear function is tc'=tc+(tc−(i*x)), wherein tc' is the clipping value, wherein tc is a constant value, wherein i is the distance of the first pixel from the block edge, and wherein x is a constant value.

7. The image processing device of claim 1, wherein the at least one processor further executes the instructions to:
determine if the block edge needs to be filtered based upon a number of decision pixel lines being lower than a number of pixel lines in the blocks surrounding the block edge in the case of a vertical block edge, and upon a number of decision pixel rows being lower than a number of pixel rows in the blocks surrounding the block edge in the case of a horizontal block edge,
for each first pixel to be filtered that is not in a decision pixel row or decision pixel line and is within the deblocking range from the block edge, the deblocking range being perpendicular to the block edge:
determine the filtered first pixel value from the original first pixel value of the first pixel and the at least one further pixel value,
determine the clipping value of the first pixel depending upon the distance of the first pixel from the block edge,
clipping the filtered first pixel value using the clipping value, resulting in the deblocked first pixel value, and
for each second pixel to be filtered in the decision pixel row or the decision pixel line and is within the deblocking range from the block edge, the deblocking range being perpendicular to the block edge:
    determine the filtered second pixel value from the original second pixel value of and the at least one additional pixel value, and
    clipping the filtered second pixel value using the constant clipping value, resulting in the deblocked second pixel value.

8. The image processing device of claim 1, wherein the at least one processor further executes the instructions to:
    determine the filtered first pixel value from the original first pixel value of the first pixel and at least one further pixel value.

9. A deblocking method for deblocking a block edge between a first block and a second block of an image, the method comprising:
    generating a filtered first pixel value from an original first pixel value of a first pixel, the first pixel being within a deblocking range from the block edge, the deblocking range comprising a number of pixels in a line perpendicular to the block edge, and the number of pixels comprises the first pixel and a second pixel;
    determining a clipping value for the first pixel dependent upon a distance of the first pixel from the block edge using a lookup table;
    clipping the filtered first pixel value using the clipping value of the first pixel, resulting in a deblocked first pixel value;
    generating a filtered second pixel value from an original second pixel value, the second pixel being within the deblocking range from the block edge; and
        clipping the filtered second pixel value using a constant clipping value, resulting in a deblocked second pixel value.

10. The method of claim 9, wherein the clipping value is a maximum allowed amount of change between the original first pixel value and the deblocked first pixel value.

11. The method of claim 9, wherein the clipping of the filtered first pixel value, using the clipping value, resulting in the deblocked first pixel value, comprises:
    setting the deblocked first pixel value to the filtered first pixel value if the absolute value of a difference between the filtered first pixel value and the deblocked first pixel value does not exceed the clipping value of the first pixel,
    setting the deblocked first pixel value to the original first pixel value plus the clipping value of the first pixel if the filtered first pixel value exceeds the original first pixel value plus the clipping value, and
    setting the deblocked first pixel value to the original first pixel value minus the clipping value of the first pixel if the filtered first pixel value is lower than the original first pixel value minus the clipping value.

12. The method of claim 9, wherein the clipping value is a monotonically decreasing function of the distance of the first pixel from the block edge.

13. The method of claim 12, wherein the monotonically decreasing function is a linear function.

14. The method of claim 9, wherein the filter is configured to determine the filtered first pixel value from the original first pixel value of the first pixel and at least one further pixel value.

15. A non-transitory computer-readable media storing computer instructions for performing a deblocking method for deblocking a block edge between a first block and a second block of an image, the instructions configure at least one processor, upon execution of the instructions, to perform the following steps:
    generating a filtered first pixel value from an original first pixel value of a first pixel, the first pixel being within a deblocking range from the block edge, the deblocking range comprising a number of pixels in a line perpendicular to the block edge, and the number of pixels comprises the first pixel and a second pixel;
    determining a clipping value for the first pixel depending upon a distance of the first pixel from the block edge, the determining using a lookup table;
    clipping the filtered first pixel value using the clipping value of the first pixel, resulting in a deblocked first pixel value;
    generating a filtered second pixel value from an original second pixel value, the second pixel being within the deblocking range from the block edge; and
        clipping the filtered second pixel value using a constant clipping value, resulting in a deblocked second pixel value.

16. The image processing device of claim 1, the image processing device being used in an image encoder and/or an image decoder.

17. The non-transitory computer-readable media of claim 15, the computer-readable media being included in an image encoder and/or an image decoder.

* * * * *